(12) United States Patent
Davis et al.

(10) Patent No.: US 6,886,073 B2
(45) Date of Patent: Apr. 26, 2005

(54) METHOD AND SYSTEM FOR PERFORMING RANGE RULE TESTING IN A TERNARY CONTENT ADDRESSABLE MEMORY

(75) Inventors: Gordon Taylor Davis, Chapel Hill, NC (US); Clark Debs Jeffries, Durham, NC (US); Jan Van Lunteren, Adliswil (CH)

(73) Assignee: International Business Machines Corporation, Armonk, NY (US)

(*) Notice: Subject to any disclaimer, the term of this patent is extended or adjusted under 35 U.S.C. 154(b) by 243 days.

(21) Appl. No.: 10/173,994

(22) Filed: Jun. 18, 2002

(65) Prior Publication Data

US 2003/0233516 A1 Dec. 18, 2003

(51) Int. Cl.[7] .............................................. G06F 12/00
(52) U.S. Cl. ........................ 711/108; 711/151; 711/158; 365/49; 709/225
(58) Field of Search .............................. 711/108, 151, 711/158; 365/49, 50; 709/225

(56) References Cited

U.S. PATENT DOCUMENTS

| | | |
|---|---|---|
| 5,920,886 A | 7/1999 | Feldmeier |
| 5,949,696 A | 9/1999 | Threewitt |
| 6,081,440 A | 6/2000 | Washburn |
| 6,108,227 A | 8/2000 | Voelkel |
| 6,137,707 A | 10/2000 | Srinivasan et al. |
| 2003/0108043 A1 * | 6/2003 | Liao .......................... 370/392 |

OTHER PUBLICATIONS

Shah, Devavrat et al., "Fast Incremental Updates on Ternary-CAMs for Routing Lookups and Packet Classification," Dept. of Computer Science, Stanford University, pp. 1–9.

* cited by examiner

Primary Examiner—Mano Padmanabhan
Assistant Examiner—Mehdi Namazi
(74) Attorney, Agent, or Firm—Sawyer Law Group LLP (57) ABSTRACT

A method and system for storing and searching for prefixes for rules, such as filter rules, in a computer system is disclosed. The method and system include providing a ternary content addressable memory (TCAM). The filter rules use range(s) of values in at least one dimension and correspond to prefix(es). The range(s) are described by prefix(es). Some filter rules may intersect. The method and system include providing priorities for the filter rules. The priorities include at least one different priority for the filter rules that intersect. The method and system also include storing the prefixes in the TCAM in block(s) in an order based upon the priorities of the filter rules. In another aspect, the method and system include searching the TCAM for a longest prefix match for a key and searching an additional storage for an almost exact match for the key in parallel with the TCAM. In this aspect, the method and system include returning the longest prefix match having a lowest or a highest location if the longest prefix match is found in the TCAM and the almost exact match is not found in the additional storage.

14 Claims, 4 Drawing Sheets

Prior Art

Figure 1

Prior Art

METHOD AND SYSTEM FOR PERFORMING RANGE RULE TESTING IN A TERNARY CONTENT ADDRESSABLE MEMORY

CROSS-REFERENCE TO RELATED APPLICATIONS

The present invention is related to co-pending U.S. patent application Ser. No. 09/540,333, filed on Mar. 31, 2000 and entitled "SYSTEM METHOD AND COMPUTER PROGRAM FOR PRIORITIZING FILTER RULES" and assigned to the assignee of the present invention. The present invention is also related to co-pending U.S. patent application Ser. No. 09/761,939 on Jan. 16, 2001 and entitled "METHOD, SYSTEM AND COMPUTER PROGRAM PRODUCT TO PARTITION FILTER RULES FOR EFFICIENT ENFORCEMENT" and assigned to the assignee of the present invention. The present invention is also related to co-pending U.S. patent application Ser. No. 09/543,531 on Apr. 6, 2000 and entitled "FULL MATCH (FM) SEARCH ALGORITHM IMPLEMENTATION FOR A NETWORK PROCESSOR" and assigned to the assignee of the present invention.

FIELD OF THE INVENTION

The present invention relates to computer systems, and more particularly to a method and system for more efficiently storing rules used in classification, such as filter rules, in a ternary content addressable memory.

BACKGROUND OF THE INVENTION

Figure 1:
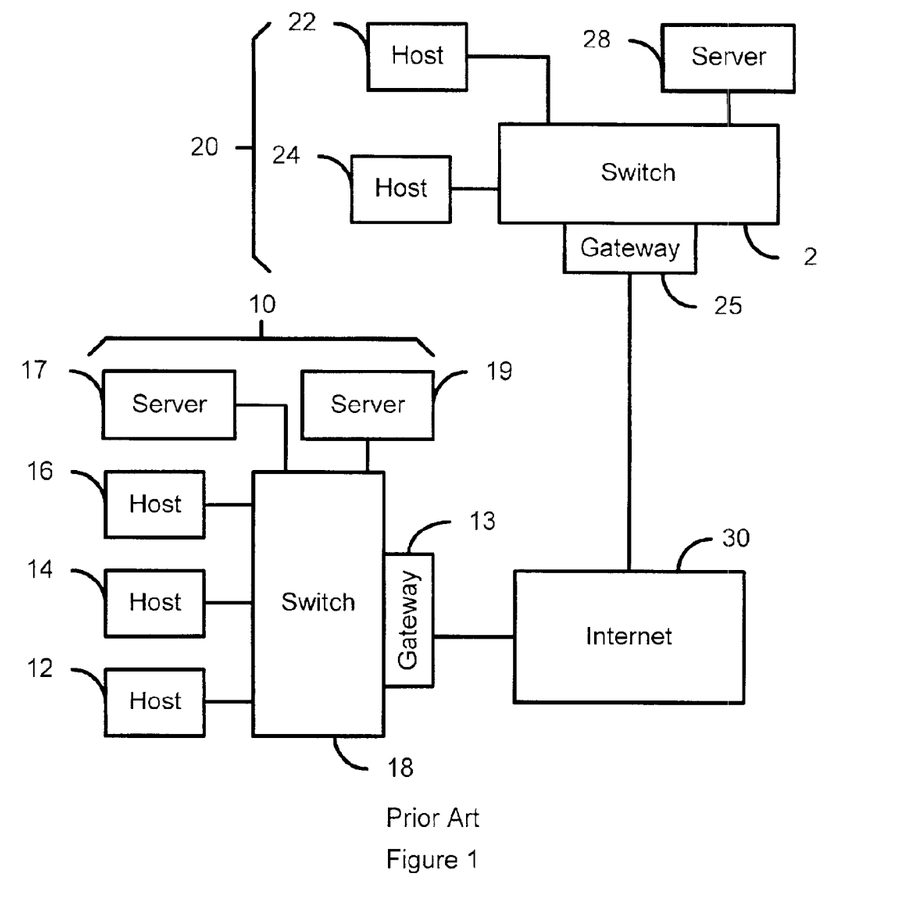
FIG. 1 is a diagram of computer systems of networks in which the present invention can be used.

FIG. 1 depicts conventional networks 10 and 20 which may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

Figure 2:
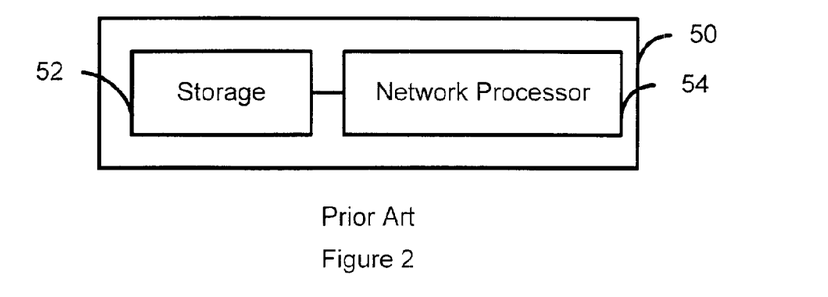
FIG. 2 is a diagram of a switch in which the present invention can be used.

FIG. 2 depicts a portion of a typical switch 50, which may be used for the switches 18 and 26 and/or a router (not shown). The switch 50 includes a network processor 52 and storage 54. The switch 50 typically also includes other components (not shown). The network processor 52 manages functions of the switch, including the classification of packets using the rules described below. The storage 54 retains data relating to the rules.

Referring to FIGS. 1 and 2, in order to manage communications in a network, such as the network 10 or 20, filter rules are used. Filter rules are typically employed by switches, routers and other portions of the network to perform packet classification. Each filter rule is used to classify packets which are being transmitted via a network in order to determine how the packet should be treated and what services should be performed. For example, a filter rule may be used in testing packets entering the network from an outside source to ensure that attempts to break into the network can be thwarted. For example, traffic from the Internet 30 entering the network 10 may be tested in order to ensure that packets from unauthorized sources are denied entrance. Similarly, packets from one portion of a network may be prevented from accessing another portion of the network. For example, a packet from some of the hosts 12, 14 or 16 may be prevented access to either the server 17 or the server 19. The fact that the host attempted to contact the server may also be recorded so that appropriate action can be taken by the owner of the network. Such filter rules may also be used to transmit traffic based on the priorities of packets. For example, packets from a particular host, such as the host 12, may be transmitted because the packets have higher priority even when packets from the hosts 14 or 16 may be dropped. The filter rules may also be used to ensure that new sessions are not permitted to be started when congestion is high even though traffic from established sessions is transmitted. Other functions could be achieved based on the filter rule.

Filter rules also typically have a priority. The filter rules can also interact based on the priority for each of the filter rules. The priority of filter rules can be used to determine the action taken when a key matches the ranges for two or more filter rules. In such a case, the filter rule having a higher priority controls the action taken. For example, a first rule may be a default rule, which treats most cases. A second rule can be an exception the first rule. The second rule would typically have a higher priority than the first rule to ensure that where a packet matches both the first and the second rule, the second rule will control. In a conventional system, all of the filter rules are placed in a list based upon their priority. Also in a conventional system, each filter rule has a different priority reflected in their position in the list. Thus, in a conventional system the number of priorities is the same as the number of filter rules. Thus, in a conventional system, the number of priorities of filter rules is large In order to determine whether a particular rule will operate on a particular packet, a key is tested. The key that is typically used consists of selected fileds, known collectively as the TCP/IP 5-tuple or just the 5-tuple, extracted from the Internet Protocol (IP) and TCP headers of the packet. The IP and TCP headers typically contains five fields of interest: the source address, the destination address, the source port, the destination port and the protocol. These fields are typically thirty-two bits, thirty-two bits, sixteen bits, sixteen bits and eight bits, respectively. Rules typically operate on one or more of these fields. For example, based on the source and/or destination addresses, the rule may determine whether a packet from a particular host is allowed to reach a particular destination address.

Furthermore, the key often contains additional bits other than the fields of the TCP/IP 5-tuple. For example, a TCP SYN (start of session) packet, which starts a session, may be characterized differently than a TCP packet for an existing session. This characterization is accomplished using bits in addition to those in the IP and TCP headers. The additional bits may be used by a filter rule which manages traffic through a network. For example, when the network is congested, the filter rule may proactively drop the TCP SYN packet while transmitting TCP packets for existing sessions. These operations allow the network to continue to operate and help reduce congestion. In order to perform this function, however, the rule utilizes a SYN packet or the additional bits which characterize a packet as a start packet or a packet from an existing session. Thus, the filter rules typically operate using a key that includes at least some fields of the IP header of a packet and may include additional bits.

In testing a key, it is determined whether to enforce a filter rule against a particular packet and thus classify the packet. The key is tested by determining whether certain fields for the key of the packet exactly match range(s) of the rule. Each rule contains a range of values in one or more dimensions. Each dimension corresponds to a field of the key (typically the IP header). One type of filter rule has a range consisting of a single value. In such a case, the key would have to exactly match the value for the rule to operate on the packet. Other rules have ranges which can be expressed using a single prefix. The prefix is a binary number containing a number of ones and zeroes (1 or 0) followed by place holders, or wildcards (*). The lower bound of the range is obtained by replacing all of the wildcards by zeros. The upper bound of the range is determined by replacing all of the wildcards by a one). Other rules have arbitrary ranges. Arbitrary ranges are ranges that cannot be expressed using a single prefix. However, an arbitrary range can be expressed using multiple prefixes.

The switch 50 uses the storage 54 to store data relating to the filter rules. In particular, the storage 54 can store the prefixes and exact values that are used to describe the ranges of the filter rules. Typically, the storage 50 is a memory such as a RAM. The storage 50 would then occupy relatively little space. However, when the prefixes residing in the storage 50 are searched to determine whether a key matches the prefix, the entries in the storage 50 are searched serially. However, the storage 50 could also use a ternary content addressable memory (TCAM). TCAMs include logic, such as a comparator, for each location. The logic allows the entries of the TCAM to be searched in parallel. A TCAM can also store one of three items in a particular location. The TCAM can store a one, a zero, or a place holder in each location. Alternatively, the TCAM can be viewed as storing a mask that indicates where a one or zero can be stored and the ones and zeroes for these locations. The TCAM can thus store the prefixes for the filter rules and rapidly search the contents of the memory.

Although the TCAM could be used for storing prefixes for filter rules, one of ordinary skill in the art will readily recognize that the TCAM is expensive. Because comparators are provided in each location, the TCAM requires a relatively large amount of space. However, it would be desirable for the storage 54 to occupy a small amount of space. In addition, the TCAM also consumes a relatively large amount of power during operation, which is undesirable.

Accordingly, what is needed is a system and method for improving the storage of prefixes for classification rules, preferably filter rules and more efficiently searching the prefixes for a match to the key. The present invention addresses such a need.

SUMMARY OF THE INVENTION

The present invention provides a method and system for storing and searching for prefixes for a plurality of rules, such as filter rules, in a computer system. The method and system comprise providing a ternary content addressable memory (TCAM). The plurality of filter rules uses at least one range of values in at least one dimension and corresponds to a plurality of prefixes. The range is described by at least one prefix. A portion of the plurality of filter rules is capable of intersecting. The method and system comprise providing a plurality of priorities for the plurality of filter rules. The priorities include at least one different priority for the portion of the plurality of filter rules that intersect. The method and system also comprise storing the plurality of prefixes in the TCAM in block(s) in an order based upon the plurality of priorities of the plurality of filter rules. In another aspect, the method and system comprise searching the TCAM for a longest prefix match for the key and searching an additional storage for an almost exact match for the key in parallel with the TCAM. In this aspect, the method and system comprise returning the longest prefix match having a lowest or a highest location if the longest prefix match is found in the TCAM and the almost exact match is not found in the additional storage.

According to the system and method disclosed herein, the present invention provides a mechanism for rapidly and efficiently storing prefixes and searching for matches to the prefixes.

DETAILED DESCRIPTION OF THE INVENTION

The present invention relates to an improvement in packet classification. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for storing and searching for prefixes for a plurality of filter rules in a computer system. The method and system comprise providing a ternary content addressable memory (TCAM). The plurality of filter rules uses at least one range of values in at least one dimension and corresponds to a plurality of prefixes. The range is described by at least one prefix. A portion of the plurality of filter rules is capable of intersecting. The method and system comprise providing a plurality of priorities for the plurality of filter rules. The priorities include at least one different priority for the portion of the plurality of filter rules that intersect. The method and system also comprise storing the plurality of prefixes in the TCAM in block(s) in an order based upon the plurality of priorities of the plurality of filter rules. In another aspect, the method and system comprise searching the TCAM for a longest prefix match for the key and searching an additional storage for an almost exact match for the key in parallel with the TCAM. In this aspect, the method and system comprise returning the longest prefix match having a lowest or a highest location if the longest prefix match is found in the TCAM and the almost exact match is not found in the additional storage.

The present invention will be described in terms of a particular set of rules utilizing certain ranges. However, one of ordinary skill in the art will readily recognize that this method and system will operate effectively for other rules using other ranges. One of ordinary skill in the art will also readily recognize that the method and system operate effectively for other systems using rules having ranges for other tasks. However, nothing prevents the application of the method and system to other rules and other types of ranges. The present invention is also described in the context of filter rules. However, one of ordinary skill in the art will readily recognize that the method and system operate effectively for other Multi-field classification rules.

Figure 3:
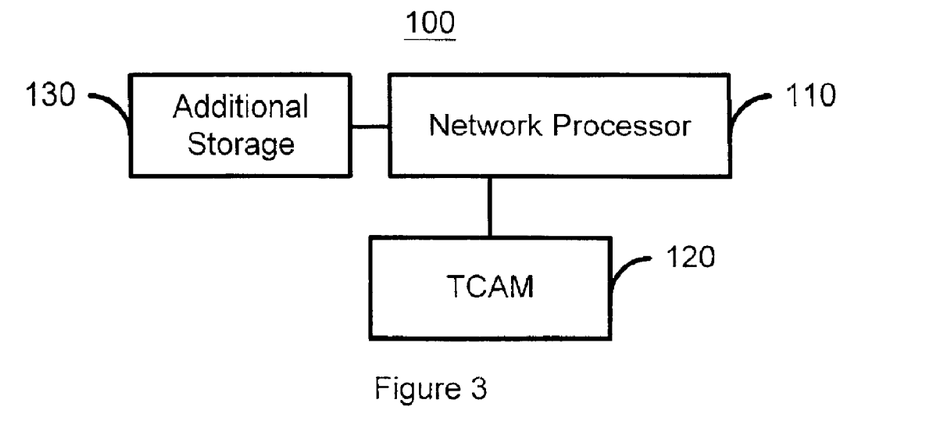
FIG. 3 is a block diagram depicting one embodiment of a system in accordance with the present invention that utilizes a TCAM for storing data relating to filter rules.

To more particularly illustrate the method and system in accordance with the present invention, refer now to FIG. 3, depicting a block diagram depicting one embodiment of a system 100 in accordance with the present invention that utilizes a TCAM for storing data relating to filter rules. The system 100 is preferably used in a network such as the networks 10 and 20. More particularly, the system 100 is preferably used in a component such as the switch 2 or 18. However, the system 100 could be used in another portion of a computer system. The system 100 is thus used with filter rules. The filter rules have ranges in one or more dimensions. These dimension correspond to fields of a key, which includes the fields of an IP header. Each of the ranges can be described by one or more prefixes.

The system 100 includes a network processor 110, a TCAM 120 and, in a preferred embodiment, an additional storage 130. The TCAM 120 is used for storing prefixes for filter rules. In addition, the filter rules have priorities. The prefixes for filter rules in the TCAM 120 are stored in blocks based on the filter rules' priorities. In one embodiment, the prefixes for filter rules stored in the first block have the highest priority, the prefixes for the filter rules stored in the second block have the next highest priority, and so on. Thus, the prefixes for the filter rules having the lowest priority are stored in the last block. In another embodiment, the prefixes for the filter rules stored in the first block have the lowest priority, the prefixes for the filter rules stored in the second block have the next lowest priority, and so on. Therefore, the prefixes for the filter rules having the highest priority are stored in the last block. When a prefix for a new filter rule is inserted into the TCAM 120, the first prefix in each subsequent block is moved to the last position in that block. Thus, prefixes for filter rules can be inserted into the TCAM 120. In a preferred embodiment, the number of different priorities for the filter rules is significantly smaller than the number of filter rules. The priorities are preferably assigned in order to ensure that intersecting filter rules can be distinguished. Intersecting filter rules are filter rules which have overlapping ranges such that a key can match all of the intersecting filter rules. Thus, different priorities are assigned to intersecting filter rules. Rules which do not intersect may have the same priority. Assignment of priorities in such a manner is described in co-pending U.S. patent application Ser. No. 09/540,333 and entitled "SYSTEM METHOD AND COMPUTER PROGRAM FOR PRIORITIZING FILTER RULES" and assigned to the assignee of the present invention. Applicant hereby incorporates by reference the above-identified patent application. Because the prefixes for filter rules are stored in the TCAM 120, the prefixes can be more rapidly searched for a longest prefix match for a key of a packet. Thus, the system 100 can more rapidly perform packet classification.

In a preferred embodiment, the additional storage 130 stores data for filter rules which may have an almost exact match. A filter rule which can have an almost exact match has one or more fields which require an exact match from the key. The remaining fields of such a filter rule can be matched by any value of the key in the fields. In one embodiment, the values for the fields of the filter rule which require an exact match are concatenated together and stored in the additional storage 130. The additional storage 130 is preferably a conventional memory such as a RAM. Note that almost exact matches are more fully described. The present invention is also related to co-pending U.S. patent application Ser. No. 09/761,939 and entitled "METHOD, SYSTEM AND COMPUTER PROGRAM PRODUCT TO PARTITION FILTER RULES FOR EFFICIENT ENFORCEMENT" and assigned to the assignee of the present invention. Applicant hereby incorporates by reference the above-mentioned co-pending patent application. Matches in the additional storage 130 are preferably searched for using a full match search algorithm. One such search algorithm is described in co-pending U.S. patent application Ser. No. 09/543,531 on Apr. 6, 2000 and entitled "FULL MATCH (FM) SEARCH ALGORITHM IMPLEMENTATION FOR A NETWORK PROCESSOR" and assigned to the assignee of the present invention. Applicant hereby incorporates by reference the above-mentioned co-pending application.

Figure 4:
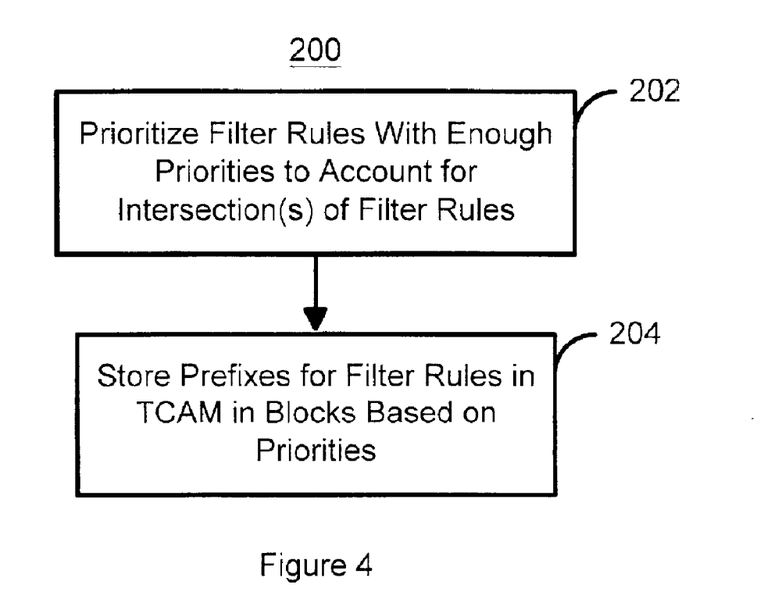
FIG. 4 is a high-level flow chart depicting one embodiment of a method in accordance with the present invention for storing data relating to filter rules in a TCAM.

FIG. 4 is a high-level flow chart depicting one embodiment of a method 200 in accordance with the present invention for storing data relating to filter rules in a memory such as the TCAM 120. Thus, the method 200 is described in conjunction with the system 100. The filter rules are prioritized, via step 202. Step 202 is preferably performed using the method and system described in co-pending U.S. patent application Ser. No. 09/540,333, filed on Mar. 31, 2000 and entitled "SYSTEM METHOD AND COMPUTER PROGRAM FOR PRIORITIZING FILTER RULES" and assigned to the assignee of the present invention. Using step 202, the filter rules are preferably prioritized such that only enough priorities are assigned to account for intersections between the filter rules. Thus, the number of priorities assigned in step 202 is preferably significantly less than the number of filter rules. The prefixes for the filter rules are stored in locations the TCAM 120 based on the priorities of the filter rules, via step 204. The prefixes for the filter rules are preferably stored in blocks such that the prefixes for all filter rules having the same priority are stored in the same block in any order. Because the filter rules are prioritized based on their intersections, the number of different priorities and thus the number of different blocks in the TCAM 120 is preferably relatively small. In addition, because the TCAM 120 is used to store the prefixes, the prefixes in the TCAM 120 can be searched in parallel for a match to a key of a packet. Consequently, the method 200 and system 100 are much faster than a conventional system.

Figure 5:
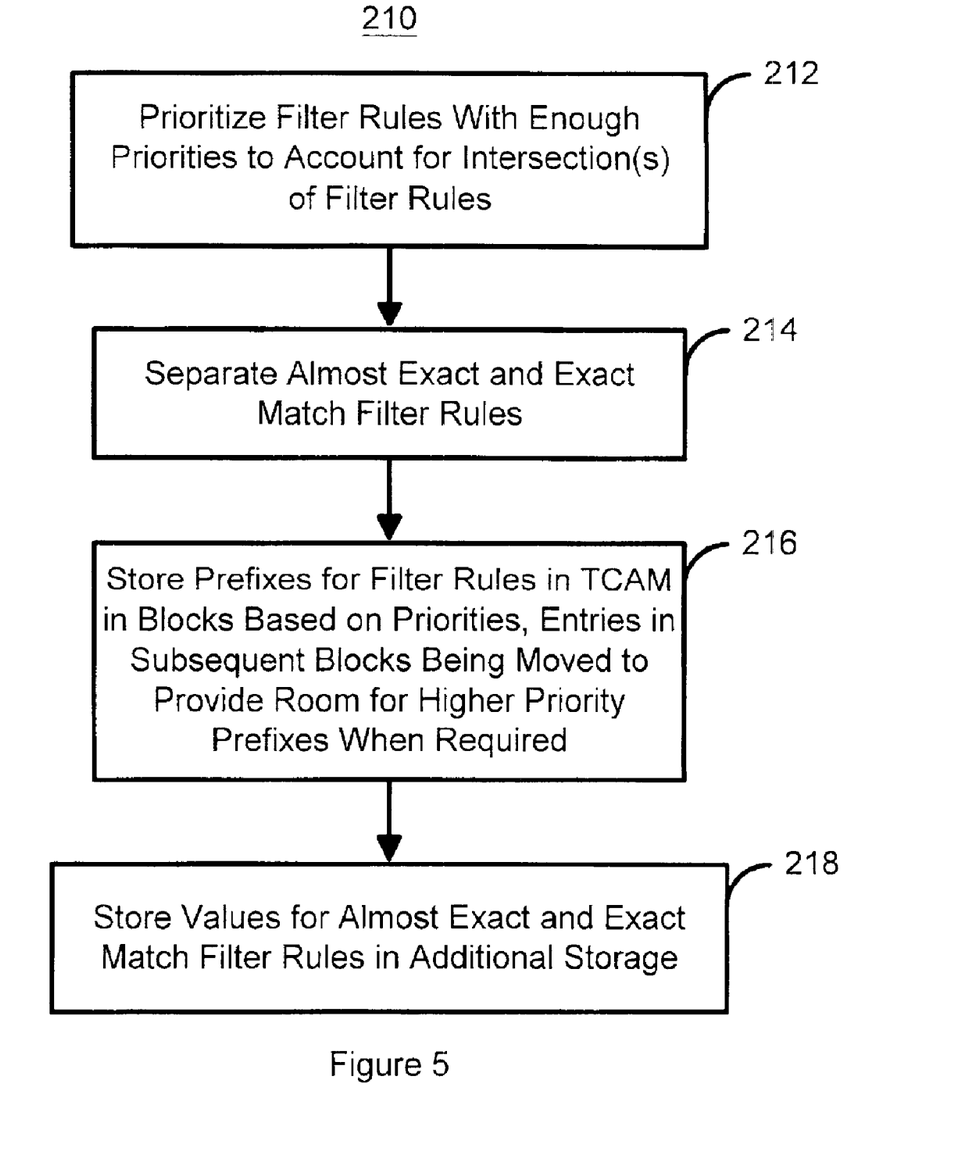
FIG. 5 is a more detailed flow chart of one embodiment of a method in accordance with the present invention for storing data relating to filter rules in a TCAM.

FIG. 5 is a more detailed flow chart of one embodiment of a method 210 in accordance with the present invention for storing data relating to filter rules in a TCAM such as the TCAM 120. The filter rules are prioritized such that only enough priorities are assigned to account for intersections between the filter rules, via step 212. Step 212 is preferably performed using the method and system described in The present invention is also related to co-pending U.S. patent application Ser. No. 09/761,939 on Jan. 16, 2001 and entitled "METHOD, SYSTEM AND COMPUTER PROGRAM PRODUCT TO PARTITION FILTER RULES FOR EFFICIENT ENFORCEMENT" and assigned to the assignee of the present invention. Thus, the number of priorities assigned in step 212 is preferably significantly less than the number of filter rules. The filter rules capable of having an exact match or an almost exact match are separated from the remaining filter rules, via step 214. A filter rules having an almost exact match require an exact match for a value in one or more fields of a key, but do not require the remaining fields of the key to match any value or prefix. Thus, the filter rules that can have an almost exact match are processed separately from the filter rules that have ranges described by prefixes. The prefixes for the filter rules are stored in locations the TCAM 120 based on the priorities of the filter rules, via step 216. The prefixes for the filter rules are preferably stored in blocks such that the prefixes for all filter rules having the same priority are stored in the same block in any order. In addition, step 216 includes inserting data such that a first entry in each subsequent block is placed at the end of that block to make room for the prefix for the higher priority filter rule to be inserted. Data for the filter rules that can have an almost exact match are stored in the additional storage, via step 218. In a preferred embodiment, step 218 includes concatenating the values for the field(s) of the key which require an exact match and storing the result along with the identity of the fields used.

Because the filter rules are prioritized based on their intersections, the number of different priorities and thus the number of different blocks in the TCAM 120 is preferably relatively small. In addition, because the TCAM 120 is used to store the prefixes, the prefixes in the TCAM 120 can be searched in parallel for a match to a key of a packet. Consequently, the method 200 and system 100 are much faster than a conventional system. Moreover, data for filter rules that have an almost exact match are stored in the additional storage 130, separately from the TCAM 120. An algorithm which searches for an exact match of the data in the additional storage 130 is relatively fast. Consequently, the TCAM 120 may store data for fewer filter rules without sacrificing speed for the rules capable of having an almost exact match. This is desirable because each location of the TCAM 120 requires logic, such as a comparator. As a result, a location in the TCAM 120 consumes more space than a location in the additional storage 130. Consequently, the combination of the TCAM 120 and additional storage 130 can store data for the filter rules using the method 210 without sacrificing speed or consuming the amount of space that would be used by a TCAM alone.

Figure 6:
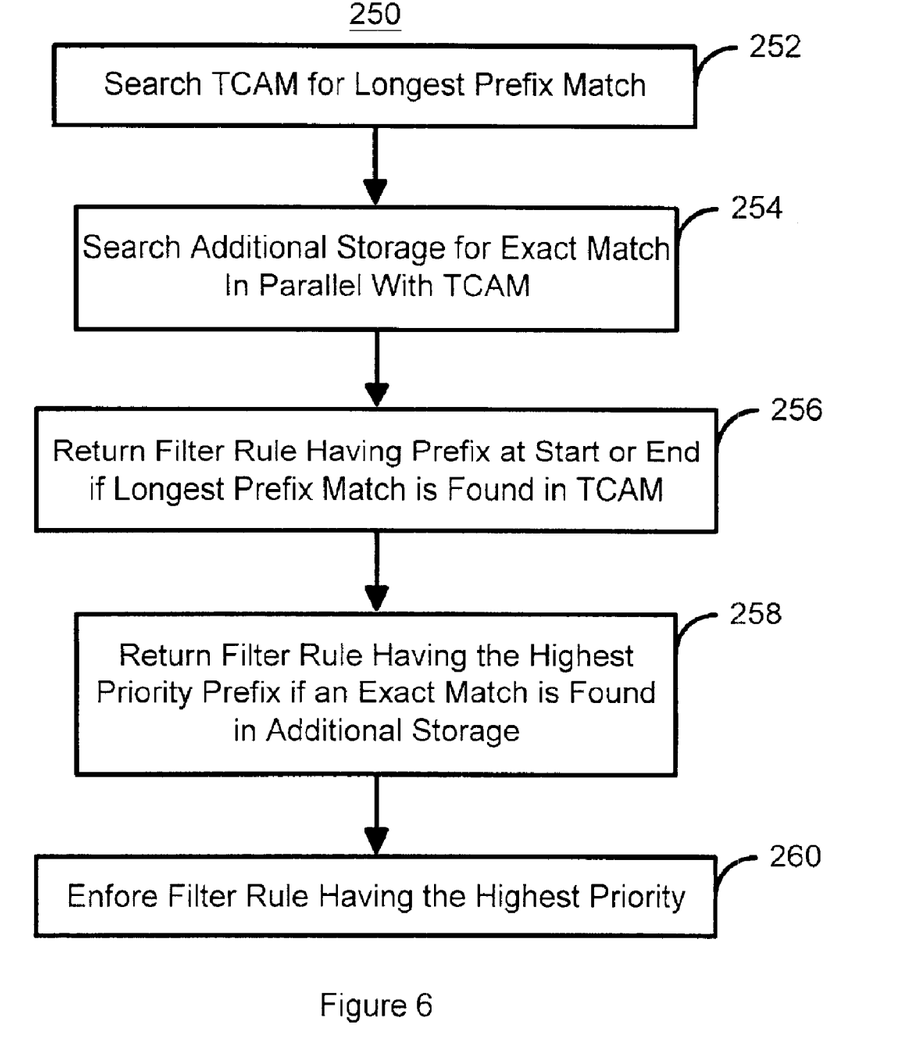
FIG. 6 is a flow chart of one embodiment of a method in accordance with the present invention for searching the TCAM for data relating to filter rules.

FIG. 6 is a flow chart of one embodiment of a method 250 in accordance with the present invention for searching the TCAM and additional storage for data relating to filter rules. The method 250 is preferably used in conjunction with the system 100. Consequently, the method 250 is used with the TCAM 120 and the additional storage 130. The method 250 is used to classify a packet having a key. The key generally includes selected fields extracted from the Internet Protocol (IP) and TCP headers of a packet. The TCAM 120 is searched for a longest prefix match for the key, via step 252. The additional storage 130 is searched for an exact match of at least portions of the key in parallel with the search of the TCAM 130, via step 254. Thus, the TCAM 120 and the additional storage 130 are searched in parallel. If one or more longest prefix match is found in the TCAM 120, then the highest priority filter rule is returned, via step 256. The highest priority filter rule is the filter rule having a prefix at either the start or the end of the matching prefixes found in the search of the TCAM 120 performed in step 252. The highest priority filter rule is at the start or end because the filter rules are preferably stored in the TCAM 120 in blocks in order (highest to lowest or lowest to highest). If exact match(es) are found in the additional storage 130, then the highest priority match from the additional storage 130 is returned from the additional storage 130, via step 258. In the event that both a longest prefix match from the TCAM 120 and an exact match from the additional storage 130 are returned, the highest priority filter rule of the filter rules returned from the TCAM 120 and the additional storage 130 is selected for enforcement, via step 260.

Using the method 250, the additional storage 130 and TCAM 120 can be rapidly searched. The search of the TCAM 120 is fast because the locations in the TCAM 120 can be searched in parallel. The search of the additional storage 130 is fast because an exact match search can be rapidly performed even though the locations are not searched in parallel. In addition, because both the TCAM 120 and the additional storage 130 are used, the combination of the TCAM 120 and additional storage 130 can store data for the filter rules without consuming the amount of space that would be used by a TCAM alone.

Thus, using the system 100 and the methods 200, 210 and 250, a TCAM and additional storage can be used to store data for filter rules. In doing so, the system 100 and methods 200, 210 and 250 consume less space and have improved speed.

A method and system has been disclosed for utilizing a TCAM for storing prefixes for filter rules. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for storing prefixes for a plurality of rules in a computer system, the computer system having a ternary content addressable memory (TCAM), the plurality of rules using at least one range of values in at least one dimension and corresponding to a plurality of prefixes, the at least one range being described by at least one prefix, a portion of the plurality of rules capable of intersecting, the method comprising:

(a) providing a plurality of priorities for the plurality of rules, the plurality of priorities including at least one different priority for the portion of the plurality of rules that intersect; and (b) storing the plurality of prefixes in the TCAM in at least one block in an order based upon the plurality of priorities of the plurality of rules, wherein the storing step (b) further includes the step of:

(b1) storing the plurality of prefixes such that a portion of the plurality of rules having identical priorities are stored in a single block.

2. The method of claim 1 wherein the plurality of rules are a plurality of filter rules.

3. A method for storing prefixes for a plurality of rules in a computer system, the computer system having a ternary content addressable memory (TCAM), the plurality of rules using at least one ranae of values in at least one dimension and corresponding to a plurality of prefixes, the at least one range being described by at least one prefix, a portion of the plurality of rules capable of intersecting, wherein the computer system further includes an additional storage and wherein the plurality of rules are further capable of including at least one rule capable of having an almost exact match, the method further comprising:

(a) providing a plurality of priorities for the plurality of rules, the plurality of priorities including at least one different priority for the portion of the plurality of rules that intersect; and (b) storing the plurality of prefixes in the TCAM in at least one block in an order based upon the plurality of priorities of the plurality of rules; and (c) separately storing in the additional storage at least one corresponding prefix for the at least one rule having the almost exact match, the additional storage capable of being searched independently from the TCAM.

4. The method of claim 1 wherein the storing step (b1) further includes the steps of:

(b1i) moving a first entry for each subsequent block to an end of the subsequent block; and (b1ii) inserting a higher priority entry in a previous block.

5. A method for searching prefixes for a plurality of rules in a computer system for a match for a key, the computer system having a ternary content addressable memory (TCAM) and an additional storage, the plurality of rules using at least one range of values in at least one dimension and corresponding to a plurality of prefixes, the at least one range being described by at least one prefix, a portion of the plurality of rules capable of intersecting, a plurality of priorities corresponding to the plurality of rules, the plurality of priorities including at least one different priority for the portion of the plurality of rules that intersect, the plurality of prefixes being stored in the TCAM in an order based upon the plurality of priorities of the plurality of rules, the plurality of rules are further capable of including at least one rule capable of having an almost exact match, the at least one rule including a plurality of fields, for the almost exact match at least one of the plurality of fields reguires an exact match while a remaining portion of the plurality of fields are matched by any value, the additional storage storing the at least one corresponding prefix for the at least one rule having the almost exact match, the additional storage capable of being searched independently from the TCAM, the method comprising the steps of:

(a) searching the TCAM for a longest prefix match for the key;

(b) searching the additional storage in parallel with the TCAM for the almost exact match for the key;

(c) returning the longest prefix match having a lowest or a highest location if the longest prefix match is found in the TCAM and the almost exact match is not found in the additional storage.

6. A computer-readable medium containing a program for storing prefixes for a plurality of rules in a computer system, the computer system having a ternary content addressable memory (TCAM), the plurality of rules using at least one range of values in at least one dimension and corresponding to a plurality of prefixes, the at least one range being described by at least one prefix, a portion of the plurality of rules capable of intersecting, the program including instructions for:

(a) providing a plurality of priorities for the plurality of rules, the plurality of priorities including at least one different priority for the portion of the plurality of rules that intersect; and (b) storing the plurality of prefixes in the TCAM in at least one block in an order based upon the plurality of priorities of the plurality of rules, wherein the storing step (b) further includes the step of;

(b1) storing the plurality of prefixes such that a portion of the plurality of rules having identical priorities are stored in a single block.

7. A computer readable medium containing a program for storing prefixes for a plurality of rules in a computer system, the computer system having a ternary content addressable memory (TCAM), the plurality of rules using at least one range of values in at least one dimension and corresponding to a plurality of prefixes, the at least one range being described by at least one prefix, a portion of the plurality of rules capable of intersecting, wherein the computer system further includes an additional storage and wherein the plurality of rules are further capable of including at least one rule capable of having an almost exact match, the at least one rule including a plurality of fields, for the almost exact match at least one of the plurality of fields requires an exact match while a remaining portion of the plurality of fields are matched by any value, the program including instructions for:

(a) providing a plurality of priorities for the plurality of rules, the plurality of priorities including at least one different priority for the portion of the plurality of rules that intersect; and (b) storing the plurality of prefixes in the TCAM in at least one block in an order based upon the plurality of priorities of the plurality of rules; and (c) separately storing in the additional storage at least one corresponding prefix for the at least one rule having the almost exact match, the additional storage capable of being searched independently from the TCAM.

8. The method of claim 6 wherein the storing step (b1) further includes the steps of:

(b1i) moving a first entry for each subsequent block to an end of the subsequent block; and (b1ii) inserting a higher priority entry in a previous block.

9. A computer-readable medium containing a program for searching prefixes for a plurality of rules in a computer system for a match for a key, the computer system having a ternary content addressable memory (TCAM) and an additional storage, the plurality of rules using at least one range of values in at least one dimension and corresponding to a plurality of prefixes, the at least one range being described by at least one prefix, a portion of the plurality of rules capable of intersecting, a plurality of priorities corresponding to the plurality of rules, the plurality of priorities including at least one different priority for the portion of the plurality of rules that intersect, the plurality of prefixes being stored in the TCAM in an order based upon the plurality of priorities of the plurality of rules, the plurality of rules are further capable of including at least one rule capable of having an almost exact match, the at least one rule including a plurality of fields, for the almost exact match at least one of the plurality of fields requires an exact match while a remaining portion of the plurality of fields are matched by any value, the additional storage at least one corresponding prefix for the at least one rule having the almost exact match, the additional storage capable of being searched independently from the TCAM, the program including instructions for:

(a) searching the TCAM for a longest prefix match for the key;

(b) searching the additional storage in parallel with the TCAM for the almost exact match for the key;

(c) returning the longest prefix match having a lowest or a highest location if the longest prefix match is found in the TCAM and the almost exact match is not found in the additional storage.

10. A system for storing prefixes for a plurality of rules in a computer system, the plurality of rules using at least one range of values in at least one dimension and corresponding to a plurality of prefixes, the at least one range being described by at least one prefix, a portion of the plurality of rules capable of intersecting, the system comprising:

a plurality of hosts for transmitting and receiving data;

a ternary content addressable memory (TCAM);

means for providing a plurality of priorities for the plurality of rules, the plurality of priorities including at least one different priority for the portion of the plurality of rules that intersect; and means for storing the plurality of prefixes in the TCAM in at least one block in an order based upon the plurality of priorities of the plurality of rules, wherein the storing means further includes means of storing the plurality of prefixes such that a portion of the plurality of rules having identical priorities is stored in a single block.

11. A system for storing prefixes for a plurality of rules in a computer system, the plurality of rules using at least one range of values in at least one dimension and corresponding to a plurality of prefixes, the at least one range being described by at least one prefix, a portion of the plurality of rules capable of intersecting, wherein the plurality of rules are further capable of including at least one rule capable of having an almost exact match, the system comprising:

a plurality of hosts for transmitting and receiving data;

a ternary content addressable memory (TCAM);

means for providing a plurality of priorities for the plurality of rules, the plurality of priorities including at least one different priority for the portion of the plurality of rules that intersect; and means for storing the plurality of prefixes in the TCAM in at least one block in an order based upon the plurality of priorities of the plurality of rules;

an additional storage; and means for separately storing in the additional storage at least one corresponding prefix for the at least one rule having the almost exact match, the additional storage capable of being searched independently from the TCAM.

12. The system of claim 10 wherein the storing means further moves a first entry for each subsequent block to an end of the subsequent block and inserting a higher priority entry in a previous block.

13. The system of claim 10 wherein the plurality of rules are a plurality of filter rules.

14. A system for searching prefixes for a plurality of rules in a computer system for a match for a key, the plurality of rules using at least one range of values in at least one dimension and corresponding to a plurality of prefixes, the at least one range being described by at least one prefix, a portion of the plurality of rules capable of intersecting, a plurality of priorities corresponding to the plurality of rules, the plurality of priorities including at least one different priority for the portion of the plurality of rules that intersect, the system comprising:

a network processor;

a ternary content addressable memory (TCAM), the plurality of prefixes being stored in the TCAM in an order based upon the plurality of priorities of the plurality of rules, the plurality of rules are further capable of including at least one rule capable of having an almost exact match, the at least one rule including a plurality of fields, for the almost exact match at least one of the plurality of fields requires an exact match while a remaining portion of the plurality of fields are matched by any value, the TCAM being searched for a longest prefix match for the key; and an additional storage, the additional storage at least one corresponding prefix for the at least one rule having the almost exact match, the additional storage capable of being searched independently from the TCAM, the additional storage being in parallel with the TCAM for the almost exact match for the key, the longest prefix match having a lowest or a highest location being returned from the TCAM if the longest prefix match is found in the TCAM and the almost exact match is not found in the additional storage.

* * * * *

UNITED STATES PATENT AND TRADEMARK OFFICE
CERTIFICATE OF CORRECTION

PATENT NO. : 6,886,073 B2  Page 1 of 1
APPLICATION NO. : 10/173994
DATED : April 26, 2005
INVENTOR(S) : Davis et al.

It is certified that error appears in the above-identified patent and that said Letters Patent is hereby corrected as shown below:

<u>Column 8</u>

Line 66, delete --ranae-- and replace with "range".

<u>Column 9</u>

Line 40, delete --reguires-- and replace with "requires".

<u>Column 10</u>

Line 8, add "-" after --computer-- and before --readable--.

Signed and Sealed this

First Day of August, 2006

JON W. DUDAS
*Director of the United States Patent and Trademark Office*